(12) United States Patent
Gardner

(10) Patent No.: US 7,487,948 B2
(45) Date of Patent: Feb. 10, 2009

(54) SUPPORT FOR SURVEY ROD

(76) Inventor: Ken Gardner, 5566 S. 200 West, Ogden, UT (US) 84405

( * ) Notice: Subject to any disclaimer, the term of this patent is extended or adjusted under 35 U.S.C. 154(b) by 590 days.

(21) Appl. No.: 10/633,075

(22) Filed: Aug. 1, 2003

(65) Prior Publication Data

US 2005/0023429 A1    Feb. 3, 2005

(51) Int. Cl.
*A47G 29/00* (2006.01)
*F16M 11/00* (2006.01)

(52) U.S. Cl. .............. 248/688; 248/171; 248/188.6; 33/295

(58) Field of Classification Search ............... 248/169, 248/168, 688, 97, 96, 528, 519, 177.1, 188.7, 248/188.6, 171; 33/295, 299
See application file for complete search history.

(56) References Cited

U.S. PATENT DOCUMENTS

| | | | | |
|---|---|---|---|---|
| 3,570,130 A | * | 3/1971 | Boehm | 33/295 |
| 4,366,940 A | * | 1/1983 | Vargas | 248/542 |
| 4,620,682 A | * | 11/1986 | Yim | 248/96 |
| 5,096,148 A | * | 3/1992 | Quellais et al. | 248/96 |
| 5,400,516 A | * | 3/1995 | Kellenberger | 33/295 |
| 5,662,296 A | * | 9/1997 | Wu | 248/96 |
| 5,823,489 A | * | 10/1998 | Suk | 248/96 |
| 6,007,031 A | * | 12/1999 | Tang | 248/96 |

* cited by examiner

*Primary Examiner*—Gwendolyn Baxter
(74) *Attorney, Agent, or Firm*—Fehr Law Firm; Thompson E. Fehr

(57) ABSTRACT

A support for a survey rod having a grip for slidable mounting on a survey rod with a first leg and a second leg rotably connected to such grip. Two spring rods each have a first end and a second end. A first end of the first spring is attached either directly to the survey rod below the grip of the support or to a collar that is connected to the survey rod below the grip of the support, and a second end of the first spring rod is connected, preferably rotatably, to the first leg. A first end of a second leg is attached in the same manner as the first end of the first leg to the survey rod, and a second end of the first leg is rotatably connected to the grip. Preferably, the first and second spring rods are resilient and rotatably mounted to the legs.

33 Claims, 4 Drawing Sheets

SUPPORT FOR SURVEY ROD

BACKGROUND OF THE INVENTION

1. Field of the Invention

This invention relates to a support for holding a survey rod.

2. Description of the Related Art

U.S. Pat. Nos. 4,192,076; 4,290,207; 4,339,880; 4,356,637; and 4,366,940 all cover devices to hold survey rods. Such devices, however, all employ tripods; and the legs of these devices do not automatically extend and retract as one forcibly plants, i.e., places the tip of the survey rod on a surface and pushes a portion of the device toward the surface, and lifts the rod.

The legs of the tripods for the stands of U.S. Pat. Nos. 4,988,064 and 5,934,628 do automatically extend and retract as the tripod is placed and removed; but the implements of these patents cannot hold a survey rod in such a manner that the tip of the rod can visibly be placed on a survey point. Even if the survey rod could replace the main post 11 in the device of U.S. Pat. No. 4,988,064, the lower holding member 40 would preclude the tip of the rod from reaching a survey point. Similarly, even if the survey rod could be placed in the lower tubular section 12 of the device of U.S. Pat. No. 5,934,628, base 18 in the first embodiment would preclude the tip of the rod from reaching a survey point; and the lower tubular section 12 in the second embodiment would preclude viewing of the tip of the rod reaching a survey point.

BRIEF SUMMARY OF THE INVENTION

The Support for Survey Rod of the present invention preferably comprises a collar which attaches, preferably releasably, to a survey rod, allowing the tip of the survey rod visibly to approach and contact a survey point.

The Support further comprises a grip that slidably mounts to the survey rod.

A first end of each of two legs is rotatably attached to the grip. A first end of each of two spring rods is attached, preferably removably and also preferably to the collar. A second end of one spring rod is connected to one of the two legs, and a second end of the other spring rod is connected to the other of the two legs. The second ends of the spring rods are always farther from an axis running between the collar and the grip than are the first ends of the spring rods so that when a survey rod has been placed in the collar and in the grip, putting the tip of the survey rod on the ground and pushing toward such tip with the grip, which may be done with a single hand, will automatically extend the legs and lifting the grip, which, again, may be done with a single hand, will automatically cause the legs to retract.

DETAILED DESCRIPTION OF THE INVENTION

Figure 1:
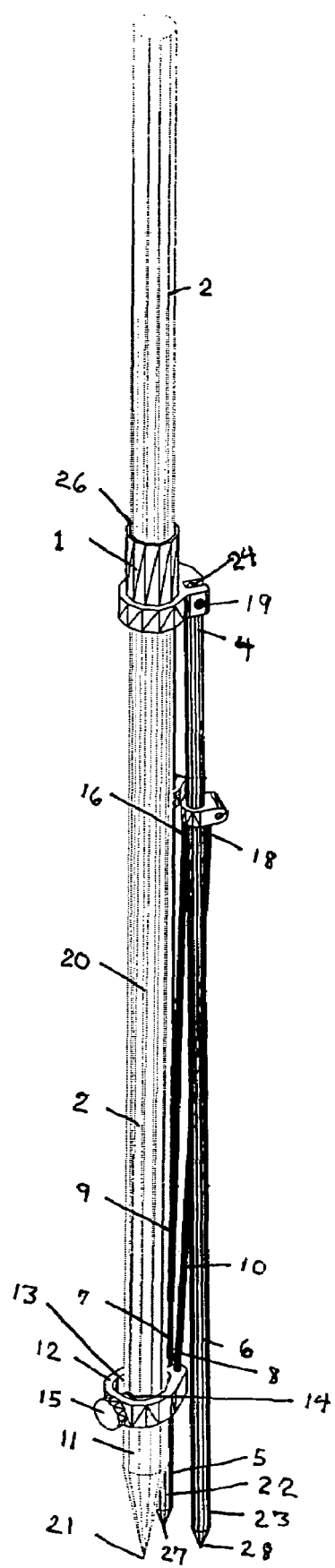
FIG. 1 shows the Support containing a survey rod with the legs of the Support retracted.
Figure 2:
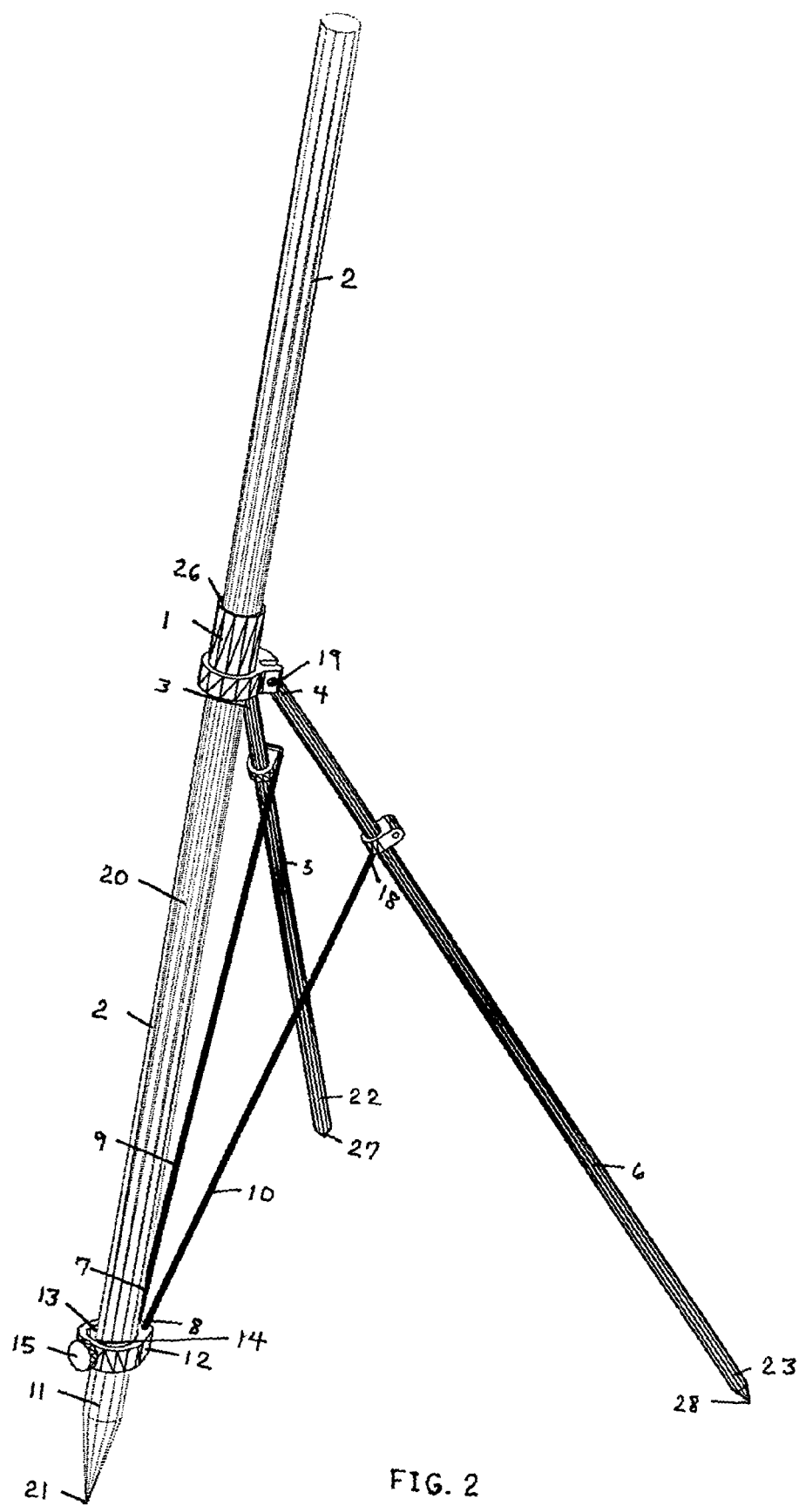
FIG. 2 portrays the Support containing a survey rod with the legs of the Support extended using resilient spring rods.
Figure 3:
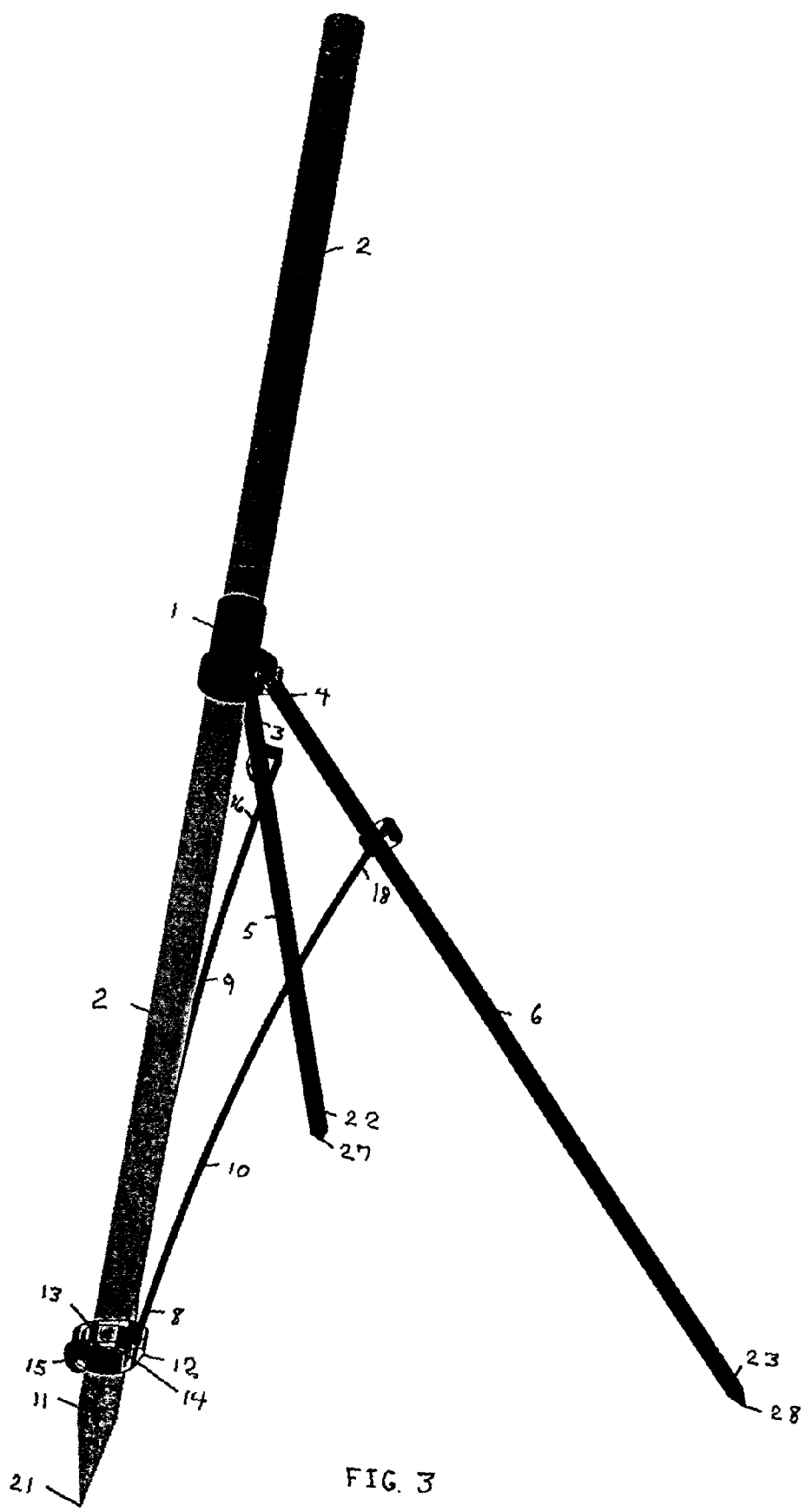
FIG. 3 displays the Support containing a survey rod with the legs of the Support extended using rigid rods.
Figure 4:
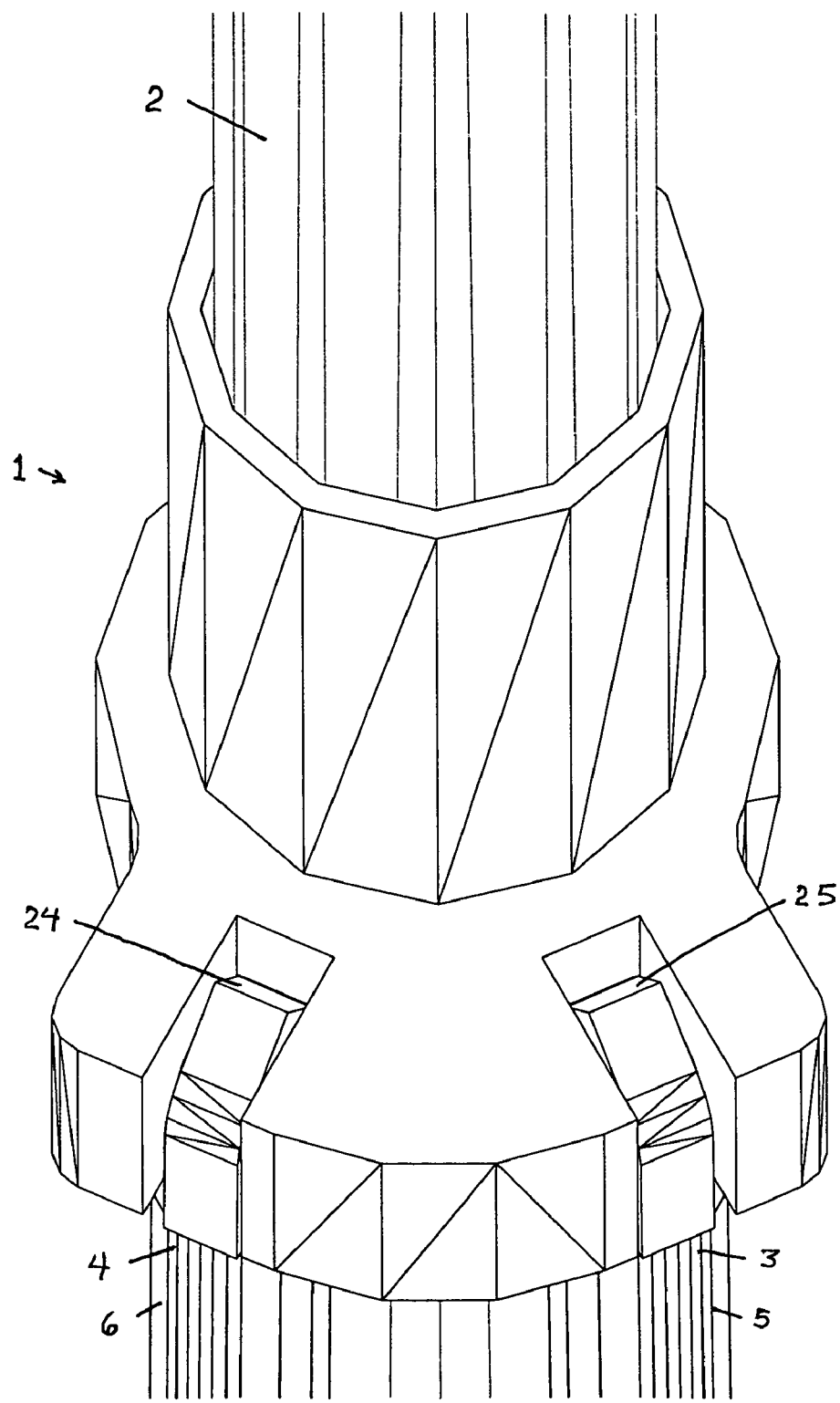
FIG. 4 illustrates the attachment of the legs to the grip.

Global Positioning Satellite (GPS) surveying equipment must remain upright in order to receive signals from the satellites upon which such a system is based. Similarly, laser reflectors must remain upright in order to maintain contact with automatic measuring stations. In both cases, however, the rod which supports the GPS surveying equipment of the laser reflector can lean somewhat. And occasionally it is desirable for a surveyor to release a survey rod without laying it on the ground.

The present invention provides a support for a surveying rod that meets the requirements discussed above and which can be operated with just one hand.

A grip 1 is slidably mountable on a survey rod 2.

Rotatably attached to the grip 1 is a first end 3, 4 of each of two legs 5, 6.

A first end 7, 8 of each of two spring rods 9, 10 is attached, preferably releasably, to the survey rod 2 below the grip 1 and preferably near the lower end 11 of the survey rod 2. Preferably, the first end 7, 8 of each of the spring rods 9, 10 is attached to a collar 12 having an aperture 13 so that the collar 12 is able to move along, i.e., be slidably mounted to, the survey rod 2 to a desired position 14, at which point 14 a fastener, preferably a releasable fastener such as a thumb screw 15 is adjusted to maintain the collar 12 at that desired point 14.

A second end 16 of the first spring rod 9 is attached to the first leg 5 below the point of rotation 17 for such first leg 5, and a second end 18 of the second spring rod 10 is attached to the second leg 6 below the point of rotation 19 for such second leg 6.

In the position for transporting the Support, the spring rods 9, 10 and the legs 5, 6 are generally adjacent to the axis 20 running between the collar 12 and the grip 1, i.e., the area of the Support intended to be occupied by the survey rod 2, although the second ends 16, 18 of the spring rods 9, 10 are farther from the axis 20 than are the first ends 7, 8 of the spring rods 9, 10. (When the first end 7, 8 of each of the two spring rods 9, 10 is attached directly to the survey rod 2, the second ends 16, 18 of the spring rods 9, 10 are, of course, farther from the survey rod 2 than are the first ends 7, 8 of the spring rods 9, 10.)

When it is desired to have the Support hold the survey rod 2 in an elevated position, the tip 21 of the lower end 11 of the survey rod 2 is placed on a surface; and the grip 1 is pushed toward the lower end 11 of the survey rod 2. Because the second ends 16, 18 of the spring rods 9, 10 are farther from the survey rod 2 than are the first ends 7, 8 of the spring rods 9, 10, this forces the second ends 16, 18 even farther from the survey rod 2, thereby pushing the lower ends 22, 23 of the legs 5, 6 farther from the survey rod 2 and creating a stable Support for the survey rod 2.

The first end 3, 4 of each leg 5, 6 preferably has a bevel 24, 25 which rotates toward and eventually against the grip 1 as each leg 5, 6 is extended and thereby limits the extension of such leg 5, 6.

Preferably, the spring rods 9, 10 are substantially straight, i.e., are sufficiently close to being perfectly straight that one of ordinary skill in the art would consider them to be straight. Also preferably, the spring rods 9, 10 are not rotatably attached to the collar 12 (or the survey rod 2). Finally, the spring rods 9, 10 are preferably resilient, which means that, if bent, the spring rods 9, 10 tend to return to their substantially straight status when the bending force is removed. Thus, in this preferred embodiment, when a survey rod 2 has been inserted into the collar 12 and the grip has been slidably mounted on the survey rod 2, preferably by having the survey rod 2 placed into an aperture 26 in the grip 1 (although a channel or any other method of slidable mounting that is well known in the art could be utilized), placing the tip 21 of the survey rod 2 on a surface and pushing the grip 1 toward the lower end 11 of the survey rod 2 will cause the spring rods 9, 10 to curve up and outward from their point of attachment to the survey rod 2 (or, preferably, the collar 12) (a feature which has not been illustrated herein), thereby extending the legs 5, 6 and creating a force which will tend to push the grip 1 and the tip 21 as the grip 1 is lifted away from the surface. This will further cause the legs 5, 6 automatically to retract when the grip 1 is thus lifted. Frictional force between the second ends 27, 28 of the legs 5, 6 and the surface will prevent the legs 5, 6 from being retracted until the grip 1 is lifted.

Preferably, the spring rods 9, 10 are rotatably attached to the legs 5, 6.

If the spring rods 9, 10 are rotatably attached to the collar 12 (or the survey rod 2) and to the legs 5, 6, such spring rods 9, 10 can be rigid.

As used herein the term "preferable" or "preferably" means that a specified element or technique is more acceptable than another but not that such specified element or technique is a necessity.

I claim:

1. A support for a survey rod, which comprises:
   a grip containing an aperture;
   a first leg having a first end and a second end with the first end of said first leg rotatably attached at a point of rotation to said grip;
   a second leg having a first end and a second end with the first end of said second leg rotatably attached at a point of rotation to said grip;
   a first spring rod having a first end and a second end with the second end of said first spring rod attached to said first leg below the point of rotation for said first leg;
   a second spring rod having a first end and a second end with the second end of said second spring rod attached to said second leg below the point of rotation for said second leg; and
   a collar having an aperture and also a releasable fastener, said collar being attached to the first end of said first spring rod and to the first end of said second spring rod with the second end of said first spring rod being farther from an axis running between said collar and said grip than is the first end of said first spring rod and with the second end of said second spring rod being farther from the axis running between said collar and said grip than is the first end of said second spring rod.

2. The support for a survey rod as recited in claim 1, wherein:
   said first spring rod is resilient; and
   said second spring rod is resilient.

3. The support for a survey rod as recited in claim 2, wherein:
   attachment of said first spring rod to said first leg is a rotatable attachment; and
   attachment of said second spring rod to said second leg is a rotatable attachment.

4. The support for a survey rod as recited in claim 3, wherein:
   the first end of said first leg has a bevel that rotates toward and eventually against said grip as said first leg is extended, thereby limiting extension of said first leg; and
   the first end of said second leg has a bevel that rotates toward and eventually against said grip as said second leg is extended, thereby limiting extension of said second leg.

5. The support for a survey rod as recited in claim 2, wherein:
   the first end of said first leg has a bevel that rotates toward and eventually against said grip as said first leg is extended, thereby limiting extension of said first leg; and
   the first end of said second leg has a bevel that rotates toward and eventually against said grip as said second leg is extended, thereby limiting extension of said second leg.

6. The support for a survey rod as recited in claim 1, wherein:
   attachment of said first spring rod to said first leg is a rotatable attachment; and
   attachment of said second spring rod to said second leg is a rotatable attachment.

7. The support for a survey rod as recited in claim 6, wherein:
   the first end of said first leg has a bevel that rotates toward and eventually against said grip as said first leg is extended, thereby limiting extension of said first leg; and
   the first end of said second leg has a bevel that rotates toward and eventually against said grip as said second leg is extended, thereby limiting extension of said second leg.

8. The support for a survey rod as recited in claim 1, wherein:
   the first end of said first leg has a bevel that rotates toward and eventually against said grip as said first leg is extended, thereby limiting extension of said first leg; and
   the first end of said second leg has a bevel that rotates toward and eventually against said grip as said second leg is extended, thereby limiting extension of said second leg.

9. The support for a survey rod as recited in claim 1, wherein:
   said first spring rod is rigid;
   attachment of said first spring rod to said first leg is a rotatable attachment;
   attachment of said first spring rod to said collar is a rotatable attachment;
   said second spring rod is rigid;
   attachment of said second spring rod to said second leg is a rotatable attachment; and
   attachment of said second spring rod to said collar is a rotatable attachment.

10. A support for a survey rod, which comprises:
    a grip containing an aperture;
    a first leg having a first end and a second end with the first end of said first leg rotatably attached at a point of rotation to said grip and also with the first end of said first leg having a bevel that rotates toward and eventually against said grip as said first leg is extended, thereby limiting the extension of said first leg;
    a second leg having a first end and a second end with the first end of said second leg rotatably attached at a point of rotation to said grip and also with the first end of said second leg having a bevel that rotates toward and eventually against said grip as said second leg is extended, thereby limiting the extension of said second leg;
    a first resilient spring rod having a first end and a second end with the second end of said first resilient spring rod rotatably attached to said first leg below the point of rotation for said first leg;
    a second resilient spring rod having a first end and a second end with the second end of said second resient spring rod rotatably attached to said second leg below the point of rotation for said second leg; and
    a collar having an aperture and also a releasable fastener, said collar being attached to the first end of said first resilient spring rod and to the first end of said second resilient spring rod with the second end of said first spring rod being farther from an axis running between said collar and said grip than is the first end of said first spring rod and with the second end of said second spring rod being farther from the axis running between said collar and said grip than is the first end of said second spring rod.

11. A support for a survey rod, which comprises:

a grip containing an aperture;

a first leg having a first end and a second end with the first end of said first leg rotatably attached at a point of rotation to said grip;

a second leg having a first end and a second end with the first end of said second leg rotatably attached at a point of rotation to said grip;

a first rigid spring rod having a first end and a second end with the second end of said first rigid spring rod rotatably attached to said first leg below the point of rotation for said first leg;

a second rigid spring rod having a first end and a second end with the second end of said second rigid spring rod attached to said second leg below the point of rotation for said second leg; and a collar having an aperture and also a releasable fastener, said collar being rotatably attached to the first end of said first rigid spring rod and to the first end of said second rigid spring rod with the second end of said first spring rod being farther from an axis running between said collar and said grip than is the first end of said first spring rod and with the second end of said second spring rod being farther from the axis running between said collar and said grip than is the first end of said second spring rod.

12. A support in combination with a survey rod, which comprises:

a survey rod;

a grip slidably mounted on said survey rod;

a first leg having a first end and a second end with the first end of said first leg rotatably attached at a point of rotation to said grip;

a second leg having a first end and a second end with the first end of said second leg rotatably attached at a point of rotation to said grip;

a first spring rod having a first end and a second end with the second end of said first spring rod attached to said first leg below the point of rotation for said first leg;

a second spring rod having a first end and a second end with the second end of said second spring rod attached to said second leg below the point of rotation for said second leg; and a collar attached to said survey rod below said grip, said collar also being attached to the first end of said first spring rod and to the first end of said second spring rod with the second end of said first spring rod being farther from an axis running between said collar and said grip than is the first end of said first spring rod and with the second end of said second spring rod being farther from the axis running between said collar and said grip than is the first end of said second spring rod.

13. The support in combination with a survey rod as recited in claim 12, wherein:

said first spring rod is resilient; and said second spring rod is resilient.

14. The support in combination with a survey rod as recited in claim 13, wherein:

attachment of said first spring rod to, said first leg is a rotatable attachment; and attachment of said second spring rod to said second leg is a rotatable attachment.

15. The support in combination with a survey rod as recited in claim 14, wherein:

the first end of said first leg has a bevel that rotates toward and eventually against said grip as said first leg is extended, thereby limiting extension of said first leg; and the first end of said second leg has a bevel that rotates toward and eventually against said grip as said second leg is extended, thereby limiting extension of said second leg.

16. The support in combination with a survey rod as recited in claim 13, wherein:

the first end of said first leg has a bevel that rotates toward and eventually against said grip as said first leg is extended, thereby limiting extension of said first leg; and the first end of said second leg has a bevel that rotates toward and eventually against said grip as said second leg is extended, thereby limiting extension of said second leg.

17. The support in combination with a survey rod as recited in claim 12, wherein:

attachment of said first spring rod to said first leg is a rotatable attachment; and attachment of said second spring rod to said second leg is a rotatable attachment.

18. The support in combination with a survey rod as recited in claim 17, wherein:

the first end of said first leg has a bevel that rotates toward and eventually against said grip as said first leg is extended, thereby limiting extension of said first leg; and the first end of said second leg has a bevel that rotates toward and eventually against said grip as said second leg is extended, thereby limiting extension of said second leg.

19. The support in combination with a survey rod as recited in claim 12, wherein:

the first end of said first leg has a bevel that rotates toward and eventually against said grip as said first leg is extended, thereby limiting extension of said first leg; and the first end of said second leg has a bevel that rotates toward and eventually against said grip as said second leg is extended, thereby limiting extension of said second leg.

20. The support in combination with a survey rod as recited in claim 12, wherein:

said first spring rod is rigid;

attachment of said first spring rod to said first leg is a rotatable attachment;

attachment of said first spring rod to said collar is a rotatable attachment;

said second spring rod is rigid;

attachment of said second spring rod to said second leg is a rotatable attachment; and attachment of said second spring rod to said collar is a rotatable attachment.

21. The support in combination with a survey rod as recited in claim 12, wherein:

the attachment of said collar to said survey rod is releasable.

22. The support in combination with a survey rod as recited in claim 21, wherein:

said first spring rod is resilient; and said second spring rod is resilient.

23. The support in combination with a survey rod as recited in claim 22, wherein:
    attachment of said first spring rod to said first leg is a rotatable attachment; and
    attachment of said second spring rod to said second leg is a rotatable attachment.

24. The support in combination with a survey rod as recited in claim 23, wherein:
    the first end of said first leg has a bevel that rotates toward and eventually against said grip as said first leg is extended, thereby limiting extension of said first leg; and
    the first end of said second leg has a bevel that rotates toward and eventually against said grip as said second leg is extended, thereby limiting extension of said second leg.

25. The support in combination with a survey rod as recited in claim 22, wherein:
    the first end of said first leg has a bevel that rotates toward and eventually against said grip as said first leg is extended, thereby limiting extension of said first leg; and
    the first end of said second leg has a bevel that rotates toward and eventually against said grip as said second leg is extended, thereby limiting extension of said second leg.

26. The support in combination with a survey rod as recited in claim 21, wherein:
    attachment of said first spring rod to said first leg is a rotatable attachment; and
    attachment of said second spring rod to said second leg is a rotatable attachment.

27. The support in combination with a survey rod as recited in claim 26, wherein:
    the first end of said first leg has a bevel that rotates toward and eventually against said grip as said first leg is extended, thereby limiting extension of said first leg; and
    the first end of said second leg has a bevel that rotates toward and eventually against said grip as said second leg is extended, thereby limiting extension of said second leg.

28. The support in combination with a survey rod as recited in claim 21, wherein:
    the first end of said first leg has a bevel that rotates toward and eventually against said grip as said first leg is extended, thereby limiting extension of said first leg; and
    the first end of said second leg has a bevel that rotates toward and eventually against said grip as said second leg is extended, thereby limiting extension of said second leg.

29. The support in combination with a survey rod as recited in claim 21, wherein:
    said first spring rod is rigid;
    attachment of said first spring rod to said first leg is a rotatable attachment;
    attachment of said first spring rod to said collar is a rotatable attachment;
    said second spring rod is rigid;
    attachment of said second spring rod to said second leg is a rotatable attachment; and
    attachment of said second spring rod to said collar is a rotatable attachment.

30. A support in combination with a survey rod, which comprises:
    a survey rod;
    a grip slidably mounted on said survey rod;
    a first leg having a first end and a second end with the first end of said first leg rotatably attached at a point of rotation to said grip and also with the first end of said first leg having a bevel that rotates toward and eventually against said grip as said first leg is extended, thereby limiting extension of said first leg;
    a second leg having a first end and a second end with the first end of said second leg rotatably attached at a point of rotation to said grip and also with the first end of said second leg having a bevel that rotates toward and eventually against said grip as said second leg is extended, thereby limiting extension of said second leg;
    a first resilient spring rod having a first end and a second end with the second end of said first resilient spring rod rotatably attached to said first leg below the point of rotation for said first leg;
    a second resilient spring rod having a first end and a second end with the second end of said second resilient spring rod rotatably attached to said second leg below the point of rotation for said second leg; and
    a collar attached to said survey rod below said grip, said collar also being attached to the first end of said first resilient spring rod and to the first end of said second resilient spring rod with the second end of said first spring rod being farther from said survey rod than is the first end of said first spring rod and with the second end of said second spring rod being farther from said survey rod than is the first end of said second spring rod.

31. A support in combination with a survey rod, which comprises:
    a survey rod;
    a grip slidably mounted on said survey rod;
    a first leg having a first end and a second end with the first end of said first leg rotatably attached at a point of rotation to said grip;
    a second leg having a first end and a second end with the first end of said second leg rotatably attached at a point of rotation to said grip;
    a first rigid spring rod having a first end and a second end with the second end of said first rigid spring rod rotatably attached to said first leg below the point of rotation for said first leg;
    a second rigid spring rod having a first end and a second end with the second end of said second rigid spring rod rotatably attached to said second leg below the point of rotation for said second leg; and
    a collar attached to said survey rod below said grip, said collar also being rotatably attached to the first end of said first rigid spring rod and to the first end of said second rigid spring rod with the second end of said first spring rod being farther from said survey rod than is the first end of said first spring rod and with the second end of said second spring rod being farther from said survey rod than is the first end of said second spring rod.

32. A support in combination with a survey rod, which comprises:
    a survey rod;
    a grip slidably mounted on said survey rod;
    a first leg having a first end and a second end with the first end of said first leg rotatably attached at a point of rotation to said grip and also with the first end of said first leg having a bevel that rotates toward and eventually against said grip as said first leg is extended, thereby limiting extension of said first leg;
    a second leg having a first end and a second end with the first end of said second leg rotatably attached at a point of rotation to said grip and also with the first end of said second leg having a bevel that rotates toward and eventually against said grip as said second leg is extended, thereby limiting extension of said second leg;

a first resilient spring rod having a first end and a second end with the second end of said first resilient spring rod rotatably attached to said first leg below the point of rotation for said first leg;

a second resilient spring rod having a first end and a second end with the second end of said second resilient spring rod rotatably attached to said second leg below the point of rotation for said second leg; and a collar releasably attached to said survey rod below said grip, said collar also being attached to the first end of said first resilient spring rod and to the first end of said second resilient spring rod with the second end of said first spring rod being farther from said survey rod than is the first end of said first spring rod and with the second end of said second spring rod being farther from said survey rod than is the first end of said second spring rod.

33. A support in combination with a survey rod, which comprises:

a survey rod;

a grip slidably mounted on said survey rod;

a first leg having a first end and a second end with the first end of said first leg rotatably attached at a point of rotation to said grip;

a second leg having a first end and a second end with the first end of said second leg rotatably attached at a point of rotation to said grip;

a first rigid spring rod having a first end and a second end with the second end of said first rigid spring rod rotatably attached to said first leg below the point of rotation for said first leg;

a second rigid spring rod having a first end and a second end with the second end of said second rigid spring rod rotatably attached to said second leg below the point of rotation for said second leg; and a collar releasably attached to said survey rod below said grip, said collar also being rotatably attached to the first end of said first rigid spring rod and to the first end of said second rigid spring rod with the second end of said first spring rod being farther from said survey rod than is the first end of said first spring rod and with the second end of said second spring rod being farther from said survey rod than is the first end of said second spring rod.

* * * * *